(12) United States Patent
Summers et al.

(10) Patent No.: US 11,712,666 B2
(45) Date of Patent: Aug. 1, 2023

(54) METHOD AND SYSTEM FOR FILTER DEVICE INTEGRITY TESTING

(71) Applicant: Pall Corporation, Port Washington, NY (US)

(72) Inventors: Jeremy C. Summers, Portsmouth Hampshire (GB); Christopher Bollom, Portsmouth Hampshire (GB); Barry G. McKenna, Portsmouth Hampshire (GB)

(73) Assignee: CYTIVA US LLC, Marlborough, MA (US)

( * ) Notice: Subject to any disclaimer, the term of this patent is extended or adjusted under 35 U.S.C. 154(b) by 16 days.

(21) Appl. No.: 17/385,399

(22) Filed: Jul. 26, 2021

(65) Prior Publication Data

US 2023/0024189 A1 Jan. 26, 2023

(51) Int. Cl.
*B01D 65/10* (2006.01)
*G01N 15/08* (2006.01)

(52) U.S. Cl.
CPC ........... *B01D 65/102* (2013.01); *G01N 15/08* (2013.01); *G01N 2015/084* (2013.01)

(58) Field of Classification Search
CPC ...... B01D 65/00; B01D 65/10; B01D 65/102; G01N 15/00; G01N 15/08; G01N 2015/084
See application file for complete search history.

(56) References Cited

U.S. PATENT DOCUMENTS

| | | | |
|---|---|---|---|
| 5,594,161 A * | 1/1997 | Randhahn | B01D 29/603 73/38 |
| 6,202,475 B1 | 3/2001 | Selbie et al. | |
| 6,666,970 B1 | 12/2003 | Jornitz et al. | |
| 6,938,460 B2 | 9/2005 | Seiler et al. | |
| 7,770,434 B2 * | 8/2010 | Brussermann | B01D 46/0012 73/38 |
| 8,689,610 B2 | 4/2014 | Grant et al. | |
| 9,095,801 B2 | 8/2015 | Stering | |
| 10,350,551 B2 | 7/2019 | Armgart et al. | |
| 2009/0218285 A1 | 9/2009 | Hank | |
| 2022/0072479 A1* | 3/2022 | Heusslein | G01N 15/0826 |

FOREIGN PATENT DOCUMENTS

| | | |
|---|---|---|
| DE | 195 03 311 B4 | 7/2011 |
| EP | 2 425 886 B1 | 6/2016 |
| EP | 3 137 195 B1 | 4/2020 |

OTHER PUBLICATIONS

Pall Life Sciences, 13-5881-USD2555a-Palltronic-Flowstar-MUX-BRO-EN(1), (2014).
European Patent Office, Extended European Search Report issued in counterpart European Patent Application No. 22180991.6, dated Dec. 7, 2022.

* cited by examiner

*Primary Examiner* — Nguyen Q. Ha
(74) *Attorney, Agent, or Firm* — Leydig, Voit & Mayer, Ltd.

(57) ABSTRACT

Methods and systems for determining the integrity of a filter device are provided.

4 Claims, 4 Drawing Sheets

METHOD AND SYSTEM FOR FILTER DEVICE INTEGRITY TESTING

BACKGROUND OF THE INVENTION

Currently, small area hydrophobic filter devices are integrity tested using an alcohol wet bubble point test, performed off-line. There is a need for improved methods for integrity testing hydrophobic porous filter devices.

The present invention provides for ameliorating at least some of the disadvantages of the prior art. These and other advantages of the present invention will be apparent from the description as set forth below.

BRIEF SUMMARY OF THE INVENTION

An aspect of the invention provides a method for testing integrity of a filter device including a porous membrane having an upstream surface and a downstream surface, the filter device comprising a housing having an inlet and an outlet and defining a fluid flow path between the inlet and the outlet, wherein the porous membrane is arranged across the fluid flow path, the method comprising: (a) passing a test liquid from a test liquid source along a test liquid source conduit and a test liquid conduit through the outlet of the filter device and covering the downstream surface of the porous membrane with the test liquid; (b) preventing additional test liquid flow from the test liquid source to the test liquid source conduit; (c) passing gas along a gas flow conduit and into the test liquid conduit including the test liquid, including applying a first pre-determined gas pressure to the test liquid, and monitoring liquid pressure on the test liquid; (d) preventing additional gas from passing along the gas flow conduit; (e) measuring a decay in liquid pressure on the test liquid over a pre-determined period of time, wherein if the liquid pressure on the test liquid decreases below a second pre-determined pressure, the filter device is considered to lack integrity.

In another aspect, a system for testing integrity of a filter device comprises: (a) a test liquid source conduit; (b) a test liquid conduit in fluid communication with both the test liquid source conduit and an outlet of a filter device including a porous membrane having an upstream surface and a downstream surface, the filter device comprising a housing having an inlet and an outlet and defining a fluid flow path between the inlet and the outlet, wherein the porous membrane is arranged across the fluid flow path; (c) a gas flow conduit in fluid communication with the test liquid conduit; (d) a fluid connector in fluid communication the test liquid source conduit, the test liquid conduit, and the gas flow conduit; and, (e) a pressure sensor arranged to sense liquid pressure in the test liquid conduit.

In one aspect, the system further comprises a monitoring unit receiving liquid pressure data from the pressure sensor.

BRIEF DESCRIPTION OF THE SEVERAL VIEWS OF THE DRAWING(S)

DETAILED DESCRIPTION OF THE INVENTION

Figure 1:
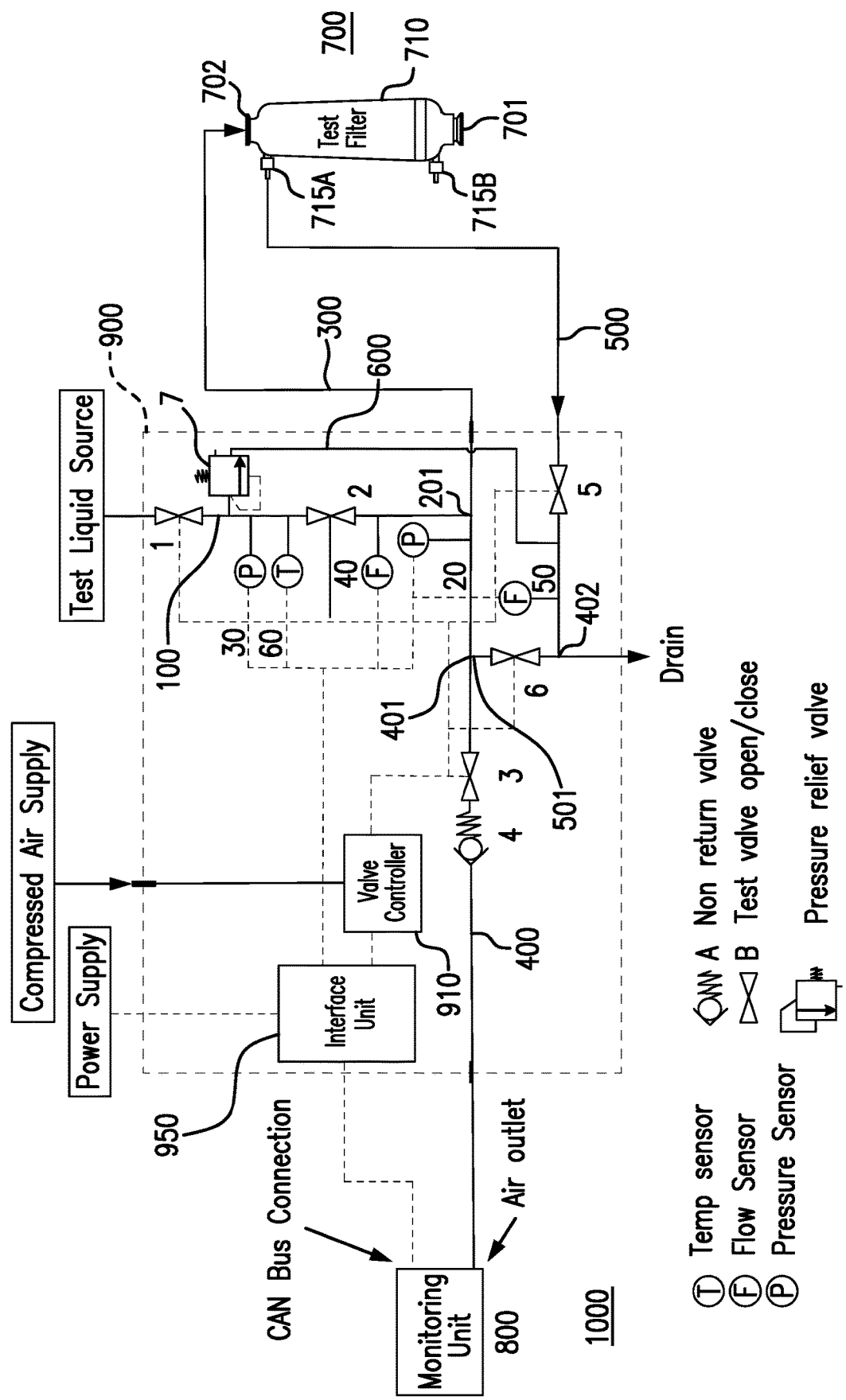
FIG. 1 is a diagrammatic illustration of a system according to an aspect of the invention.

In accordance with an aspect of the invention, a method for testing integrity of a filter device including a porous membrane having an upstream surface and a downstream surface is provided, the filter device comprising a housing having an inlet and an outlet and defining a fluid flow path between the inlet and the outlet, wherein the porous membrane is arranged across the fluid flow path, the method comprising: (a) passing a test liquid from a test liquid source along a test liquid source conduit and a test liquid conduit through the outlet of the filter device and covering the downstream surface of the porous membrane with the test liquid; (b) preventing additional test liquid flow from the test liquid source to the test liquid source conduit; (c) passing gas along a gas flow conduit and into the test liquid conduit including the test liquid, including applying a first pre-determined gas pressure to the test liquid, and monitoring liquid pressure on the test liquid; (d) preventing additional gas from passing along the gas flow conduit; (e) measuring a decay in liquid pressure on the test liquid over a pre-determined period of time, wherein if the liquid pressure on the test liquid decreases below a second pre-determined pressure, the filter device is considered to lack integrity.

In a typical aspect, the filter device housing includes at least one vent port and the method further comprises (f) draining test liquid from the filter device though the at least one vent port.

In another aspect, a system for testing integrity of a filter device comprises: (a) a test liquid source conduit; (b) a test liquid conduit in fluid communication with both the test liquid source conduit and an outlet of a filter device including a porous membrane having an upstream surface and a downstream surface, the filter device comprising a housing having an inlet and an outlet and defining a fluid flow path between the inlet and the outlet, wherein the porous membrane is arranged across the fluid flow path; (c) a gas flow conduit in fluid communication with the test liquid conduit; (d) a fluid connector in fluid communication the test liquid source conduit, the test liquid conduit, and the gas flow conduit; and, (e) a pressure sensor arranged to sense liquid pressure in the test liquid conduit.

Aspects of the system can further comprise a flow sensor arranged to sense test liquid entering the test liquid conduit.

In one aspect, the system includes a control unit including at least two pressure sensors and at least two flow sensors.

In one aspect, the system further comprises a monitoring unit receiving liquid pressure data from the pressure sensor. Alternatively, or additionally, aspects of the system comprise a flow sensor arranged to sense liquid entering the test liquid conduit.

Aspects of the invention are particularly suitable for alcohol-free, pre-use, post sterilization integrity tests of small area hydrophobic venting filter devices, carried out in-situ in a system including the filter device. In such applications, the test fluid is directed to the non-sterile side of the filter device and membrane, and the method can be carried out without breaching the integrity of the system. As a result, filter devices can be tested by the operator immediately before processing/producing the desired fluid (e.g., such as a drug or reagent).

Advantageously, in contrast with testing using gas, since the test liquid in accordance with the invention (preferably, water) is essentially incompressible, a faster pressure decay response is obtained. Additionally, an increase in sensitivity is achieved in comparison to conventional tests, allowing small area filters to be tested (e.g., approximately 20 cm$^2$ effective filter area (EFA)) as compared to standard water intrusion tests (that measure pressure drop in air space above the test liquid), used in testing filters with about 480 cm$^2$ EFA. Moreover, lower test pressures can be used as compared to standard water intrusion tests.

Typically, the porous membranes to be tested have EFAs in the range of about 5 cm$^2$ EFA to about 0.7M$^2$ EFA, typically, in the range of from about 20 cm$^2$ EFA to about 0.7M$^2$ EFA.

Aspects of the system include at least one test liquid source conduit, at least one test liquid conduit, at least one gas flow conduit, and a fluid connector connected to, and in fluid communication with, a test liquid source conduit, a test liquid conduit, and a gas flow conduit. Liquid from a test liquid source container passes from the test liquid source container, through the test liquid source conduit(s), the fluid connector, and through the test liquid conduit(s) to the outlet of the tested filter device containing the porous membrane. Gas is passed from a gas supply along the gas flow conduits (s), through the fluid connector, and into a test liquid conduit containing the test liquid. At least one flow control device such as a valve is associated with a test liquid source conduit and a gas flow conduit. A drain conduit is connected to, and in fluid communication with, a vent port of the tested filter device, allowing test fluid and drying air to drain the device (without test fluid passing through the membrane). Optionally, an additional drain conduit is connected to, and in fluid communication with, a gas flow conduit, allowing test liquid to be drained from the system. At least one flow control device such as a valve is separately associated with each of a test liquid source conduit, a gas flow conduit, and a drain conduit. Optionally, the system includes a pressure relief conduit and pressure relief valve to allow pressure to be released in order to prevent the filter device to be tested from over-pressure, A first pressure sensor (while the term "pressure sensor" is used, it should be understood to also encompass a "pressure transducer" or a "pressure transmitter") is arranged to monitor test liquid (water) inlet pressure, and a second pressure sensor or pressure transducer is arranged to provide pressure data during testing. A first flow sensor is arranged to provide confirmation of test liquid entering the system, and a second flow sensor is arranged to provide a signal confirming that test liquid has filled the filter device circuit. If desired, the system can include a temperature sensor to monitor the temperature of the test liquid.

An interface unit is operably connected to the various sensors and/or transducers and flow control devices to control flow and receive data from the sensors and/or transducers, and communicate with the monitoring unit.

Each of the components of the invention will now be described in more detail below, wherein like components have like reference numbers.

FIG. 1 is a diagrammatic illustration of a system 1000 according to an aspect of the invention, for testing a filter device 700 comprising a housing 710 having inlet and outlet ports and defining a fluid flow path between the inlet and the outlet with a porous membrane arranged in the housing across the fluid flow path. Aspects of the testing method comprise passing fluid into the filter device through the outlet; subsequently, after the tested filter device is determined to be integral, fluid to be filtered is passed into the device through the inlet. In the illustrated aspect of the system shown in FIGS. 1, 702 and 715A are, respectively, the inlet and outlet ports in the context of testing for filter device integrity (as these are the ports through which the test fluid enters and leaves the filter device), and 701 and 702 are, respectively, the inlet and outlet ports in the context of fluid filtration.

The illustrated system 1000 includes a monitoring unit 800 (such as a filter integrity test instrument) for running the tests and receiving and outputting measured data from various sensors and/or transducers passed from an interface unit 950 (including flow control device (valve) controllers (illustrated separately as 910)), which is a component of a control unit 900 that also includes the various sensors/ transducers, a gas supply, conduits, and flow control devices. In the illustrated system, the monitoring unit 800 communicates with the interface system 950 via a CAN bus connection.

The illustrated system 1000 includes a test liquid source conduit 100, wherein flow control devices 1 and 2 are associated with the conduit 100. One end of conduit 100 is in fluid communication with a test liquid source (wherein flow control device 1 is arranged closer to the test liquid source than is flow control device 2), and the other end of the conduit is shown in fluid communication with a first branch of a three-branch connector 201.

Also shown is a test liquid conduit 300, wherein one end of the test liquid conduit 300 is in fluid communication with a second branch of the three-branch connector 201, and the other end of conduit 300 is in fluid communication with the outlet 702 (preferably connected via a quick-release connector), of the tested filter device housing 710.

Also shown is a gas conduit 400, wherein flow control device 3 and an optional flow control device 4 (shown as a one-way valve) are associated with the conduit 400. One end of conduit 400 is in communication with monitoring unit 800 (e.g., an filter integrity test instrument), and the other end of conduit is in fluid communication with the third branch of the three-branch connector 201. The optional flow control device 4 is arranged closer to monitoring unit 800 than flow control device 3, and flow control device 4 is preferably a one-way valve to prevent test fluid from entering the monitoring unit.

FIG. 1 also shows a first drain conduit 500, with a flow control device 5 associated with the conduit 500, where one end of conduit 500 is in fluid communication with a vent port 715A (preferably connected via a quick-release connector) of the tested filter device housing. Alternatively, the end of conduit 500 could be in fluid communication with a vent port 715B. The vent ports allow gas and liquid venting wherein liquid does not pass through the porous membrane. The Figure also shows a second drain conduit 501, with a flow control device 6 associated with conduit 501, wherein one end of the conduit 501 is in fluid communication with the gas conduit 400 (e.g., by a three-branch connector 401). Optionally, the other ends of conduits 500 and 501 are in fluid communication (e.g., by a three-branch connector 402).

Optionally, a pressure-relief conduit 600 is in fluid communication with test liquid source conduit 100 and first drain conduit 500, with a flow control device 7 (shown as pressure-relief valve). If desired, the pressure relief conduit and valve allow pressure to be released in order to prevent the filter device to be tested from over-pressure from pressure passed along the test liquid source conduit 100.

First pressure sensor/pressure transducer 20 is arranged to provide pressure data during testing, and second pressure sensor/pressure transducer 30 is arranged to monitor test liquid (water) inlet pressure. First flow sensor 40 is arranged to provide confirmation of test liquid entering the system, and second flow sensor 50 is arranged to provide a signal confirming that test liquid has filled the filter device circuit. Optional temperature sensor 60 monitors the temperature of the test liquid.

Figure 2:
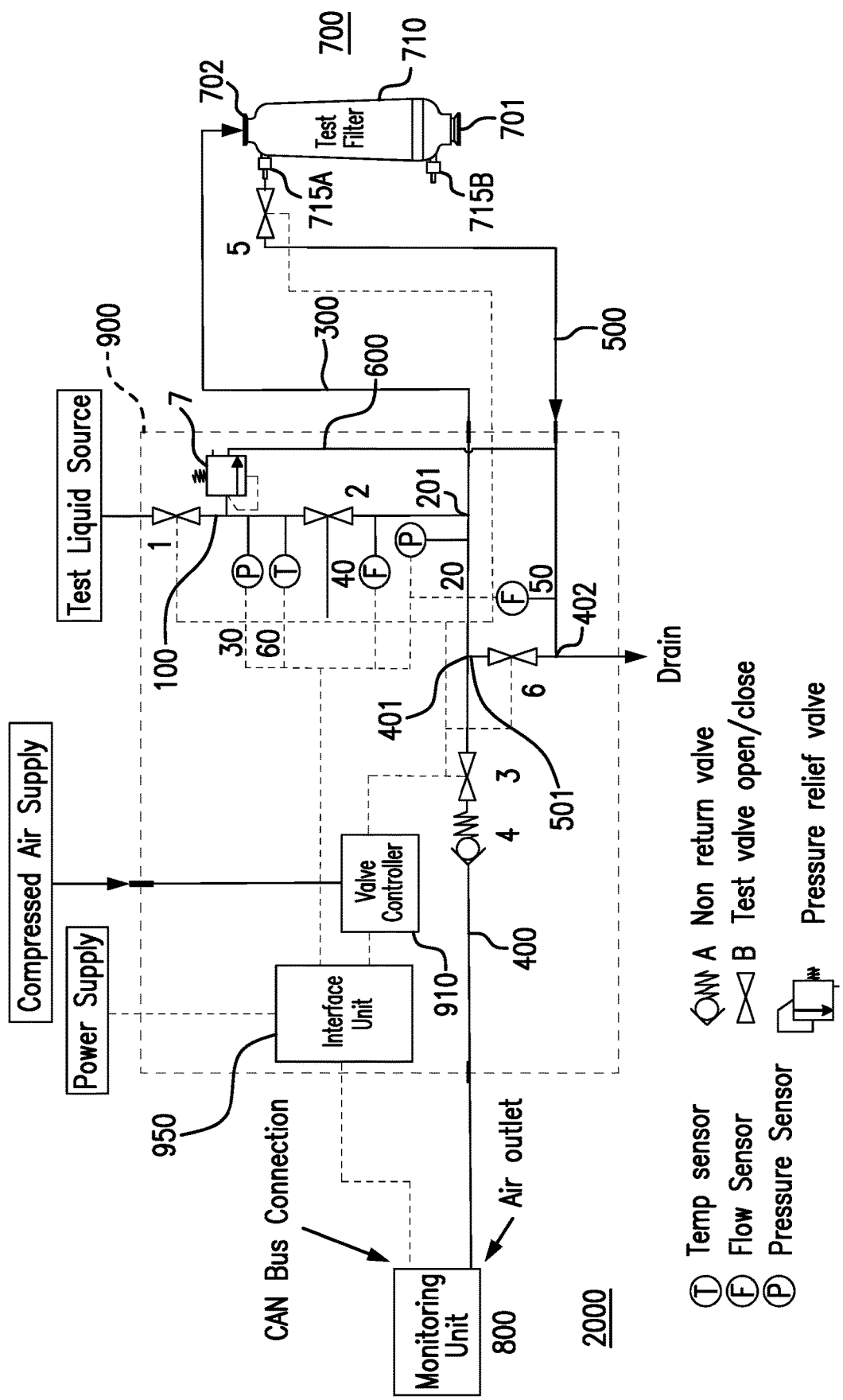
FIG. 2 is a diagrammatic illustration of a system according to another aspect of the invention.

FIG. 2 is a diagrammatic illustration of a system 2000 according to an aspect of the invention. The illustrated aspect of the system 2000 is similar to the illustrated aspect of the system 1000, wherein the same components are illustrated, and have the same functions, with the exception of the location of optional flow control device 5. In the aspect shown in FIG. 2, the flow control device 5 is located close to the tested filter device, allowing a shorter length of tubing to be pressurized during testing.

Using FIGS. 1 and 2 for general reference, one aspect for testing the integrity of a filter device including a porous membrane using the illustrated systems is as follows:

Initially, flow control devices 1-3, 5, and 6 are closed, as the system is set up and connected to the filter device to be tested. The test is initiated by the user through the user interface of the monitoring unit.

Flow control devices 1 and 2, and 5 are opened, and test fluid passes from the test liquid source along test liquid source conduit 100 and test liquid conduit 300 into the outlet 702 of the test filter device housing 710, through the vent port 715A, the first drain conduit 500, and drained from the system. Through the interface unit 950, temperature sensor 60 is monitored to confirm that the test fluid temperature is within acceptable limits, first flow sensor 40 is monitored to confirm test fluid is flowing into the test filter device, and flow sensor 50 is monitored to confirm test fluid is returning from the filter device to be drained.

The accurately controlled pre-selected (first pre-determined) gas pressure is applied to the liquid in the test liquid conduit and measured by the monitoring unit, wherein flow control device 4 allows flow in the desired direction, flow control device 3 is opened, and flow control devices 1, 2, and 5 are closed. Once the gas pressure is determined to be stable, the monitoring unit sends a start test command, and flow control device 3 is closed and gas flow is stopped.

Pressure transducer 20 is monitored for measuring the gas pressure decay over a desired period of time. Based on the second predetermined gas pressure, the test result is indicated as pass or fail.

Once the test result has been indicated, flow control devices 2, 5, and 6 are opened, and test fluid is drained from the test filter device through first drain conduit 500 and second drain conduit 501.

Subsequently, flow control device 3 is opened, and flow control device 6 is closed, and gas is passed from the monitoring unit and through the rest of the system and the test filter device vent port and the first drain conduit 500 to remove residual liquid.

A variety of interface systems 950 are suitable for use in the invention. Typically, the interface system includes a printed circuit board, a power supply (alternatively, an external power supply can be used), as well as flow control device (valve) controllers (illustrated separately as 910) and sensor/transducer controllers, and pressure regulator controllers, wherein the interface system controls and monitors the flow, pressure, and temperature of liquid and gas.

A variety of sensors (e.g., temperature sensors, flow sensors, pressure sensors, and pressure transducers), flow control devices (e.g., clamps, non-return valves, pneumatically actuated valves, solenoid valves, pressure relief valves), and connectors (including integral, e.g., three branch connectors in the form of Y- or T-connectors, and quick-release connectors) are suitable for use in aspects of the invention, and are known in the art.

A variety of filter integrity test instruments for running the tests are suitable for use in the invention. Typical filter integrity test instruments include a user interface; and a computer readable medium bearing a program; and a processor configured to execute the program, which calibrates measurements according to set programs and parameters. If desired, the program executed by the processor is stored upon a non-transitory computer-readable medium, and the processor displays (outputs) the data. Suitable examples include the Palltronic® Flowstar IV filter integrity test instrument and the Palltronic® Flowstar V filter integrity test instrument (Pall Corporation, Port Washington, N.Y.).

A variety of porous and microporous membranes and filter devices including the membranes (e.g., a filter device comprising a housing comprising at least one vent port, and an inlet and an outlet and defining a fluid flow path between the inlet and the outlet, wherein the membrane is disposed in the housing across the fluid flow path), including commercially available membranes and filter devices, are suitable for use in accordance with aspects of the invention. Preferably, the filter device is sterilizable. Any housing of suitable shape and providing at least one vent port and at least one inlet and at least one outlet may be employed. Aspects of the invention are particularly suitable for single-use filter devices, including vent filter devices, e.g., as single-use vent filter devices used with capsule filters and bioreactors.

A variety of porous and microporous membranes, including commercially available membranes, are suitable for use in accordance with aspects of the invention. Preferred membranes include porous and microporous PVDF and PTFE membranes. Suitable membranes include, for example, EMFLON® II membranes and EMFLON® PFR membranes (Pall Corporation, Port Washington, N.Y.).

The membranes can have any suitable pore structure, e.g., a pore size (for example, as evidenced by bubble point, or by KL as described in, for example, U.S. Pat. No. 4,340,479, or evidenced by capillary condensation flow porometry), a mean flow pore (MFP) size (e.g., when characterized using a porometer, for example, a Porvair Porometer (Porvair plc, Norfolk, UK), or a porometer available under the trademark POROLUX (Porometer.com; Belgium)), a pore rating, a pore diameter (e.g., when characterized using the modified OSU F2 test as described in, for example, U.S. Pat. No. 4,925,572), or removal rating media. The pore structure used depends on the size of the particles to be utilized, the composition of the fluid to be treated, and the desired effluent level of the treated fluid.

One of skill in the art can selected the first and second pre-determined pressures and time periods based on the membranes to be tested.

The membranes can have any desired critical wetting surface tension (CWST, as defined in, for example, U.S. Pat. No. 4,925,572) less than 53 dynes/cm ($53 \times 10^{-5}$ N/cm). The CWST can be selected as is known in the art, e.g., as additionally disclosed in, for example, U.S. Pat. Nos. 5,152,905, 5,443,743, 5,472,621, and 6,074,869. Typically, the CWST is in the range of from about 20 dynes/cm (about $20 \times 10^{-5}$ N/cm) to about 40 dynes/cm (about $40 \times 10^{-5}$ N/cm), preferably in the range of about 22 dynes/cm (about $22 \times 10^{-5}$ N/cm) to about 35 dynes/cm (about $35 \times 10^{-5}$ N/cm).

The test liquid (water) has a low conductivity (for example, in the range of from about 2 to about 3 μS/cm), and can be deionizied water, or sterile water for injection.

The following examples further illustrate the invention but, of course, should not be construed as in any way limiting its scope.

Example 1

This example demonstrates test results of filter devices containing integral and non-integral PVDF microporous membranes (Pall Corporation; Port Washington, N.Y.) tested based upon an aspect of the invention. The EFA is 380 cm$^2$, the pore size is 0.2 μm (thus providing for sterile filtration), and the CWST is about 30 dynes/com (about 30×10$^{-5}$ N/cm).

The membranes are too small for testing using a conventional water intrusion test that measures pressure drop or direct gas flow in the air space above the test liquid.

After flushing with water having a low conductivity, and drying, 10 devices with PVDF membranes that had previously failed manufacturing reverse bubble point integrity tests, and 4 devices with PVDF standard production membranes, are tested using a Palltronic® Flowstar IV filter integrity test instrument (Pall Corporation, Port Washington, N.Y.), and the devices are filled from the bottom (outlet) up with water having a low conductivity.

Using the filter integrity test instrument, 1 bar gas pressure (first pre-determined gas pressure) is applied, and once stable gas pressure is reached, the gas line is clamped. Gas pressure is logged once the gas line is clamped, and gas pressure decay curves over a 20 minute period are plotted from the data collected. Filter devices are considered to pass the test if the gas pressure (second pre-determined gas pressure) is greater than 800 mbar at 400 seconds.

Figure 3:
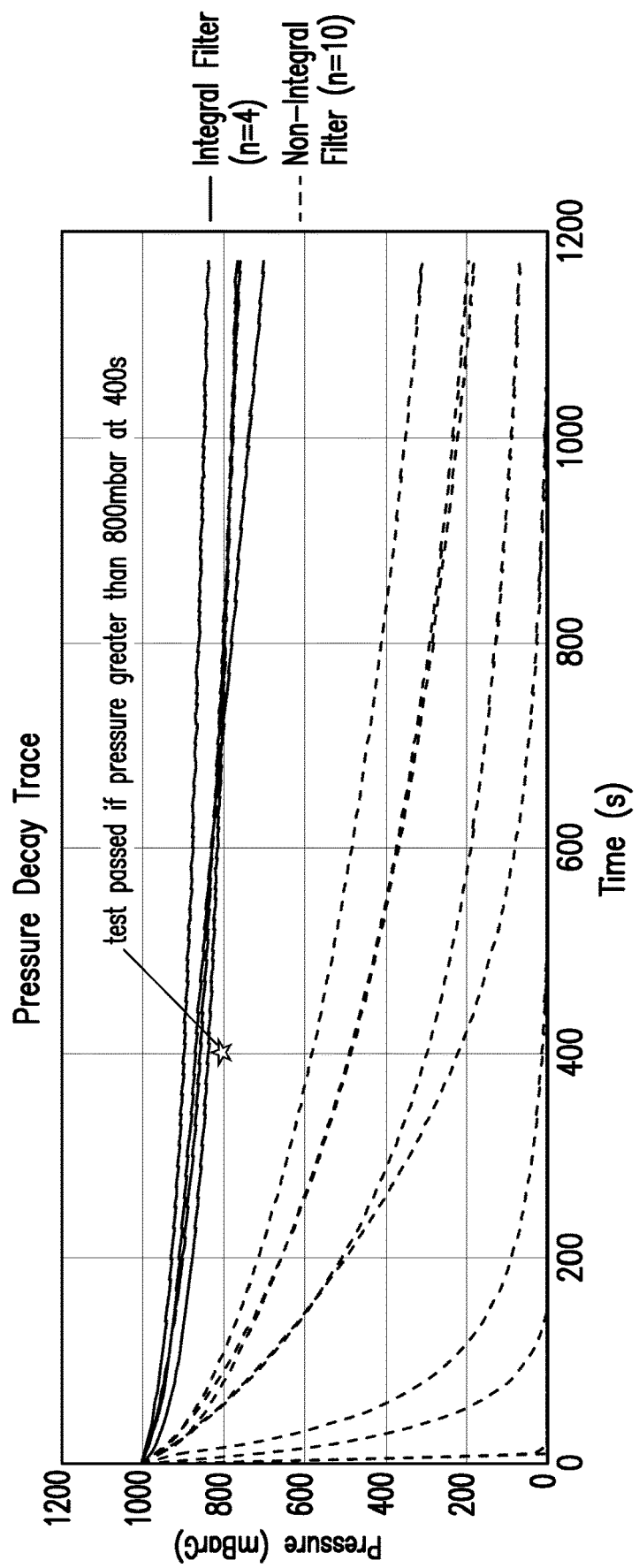
FIG. 3 shows pressure decay curves resulting from tests of integral and non-integral PVDF filter devices based on an aspect of the invention.

As shown in the pressure decay trace in FIG. 3, after 20 minutes (1200 seconds), the pressure (mBarG) for the devices with 4 integral membranes ranges from about 750 to about 850 mBarG. In contrast, for devices with several of the non-integral membranes, the pressure is 0 mBarG in about 150 to about 1000 seconds, and the pressure did not reach over about 350 mBarG for any non-integral membrane.

This example shows that a pass/fail limit can be drawn between devices with integral and non-integral PVDF membranes.

Example 2

This example demonstrates test results of integral and non-integral PTFE microporous membranes (Pall Corporation; Port Washington, N.Y.) according to an aspect of the invention. The EFA is 280 cm$^2$, the pore size is 0.2 μm (thus providing for sterile filtration), and the CWST is about 23 dynes/com (about 23×10$^{-5}$ N/cm).

The membranes are too small for testing using a conventional water intrusion test that measures pressure drop or direct gas flow in the air space above the test liquid.

After flushing with water having a low conductivity, and drying, 10 devices with PTFE membranes that had previously failed manufacturing reverse bubble point integrity tests, and 15 devices with PTFE standard production membranes, are tested using a Palltronic® Flowstar IV filter integrity test instrument (Pall Corporation, Port Washington, N.Y.), and the devices are filled from the bottom (outlet) up with water having a low conductivity.

Using the filter integrity test instrument, 2.5 bar gas pressure (first pre-determined gas pressure) is applied, and once stable gas pressure is reached, the gas line is clamped. Gas pressure is logged once the gas line is clamped, and gas pressure decay curves over a 20 minute period are plotted from the data collected. Filter devices are considered to pass the test if the gas pressure (second pre-determined gas pressure) is greater than 1900 mbar at 400 seconds.

Figure 4:
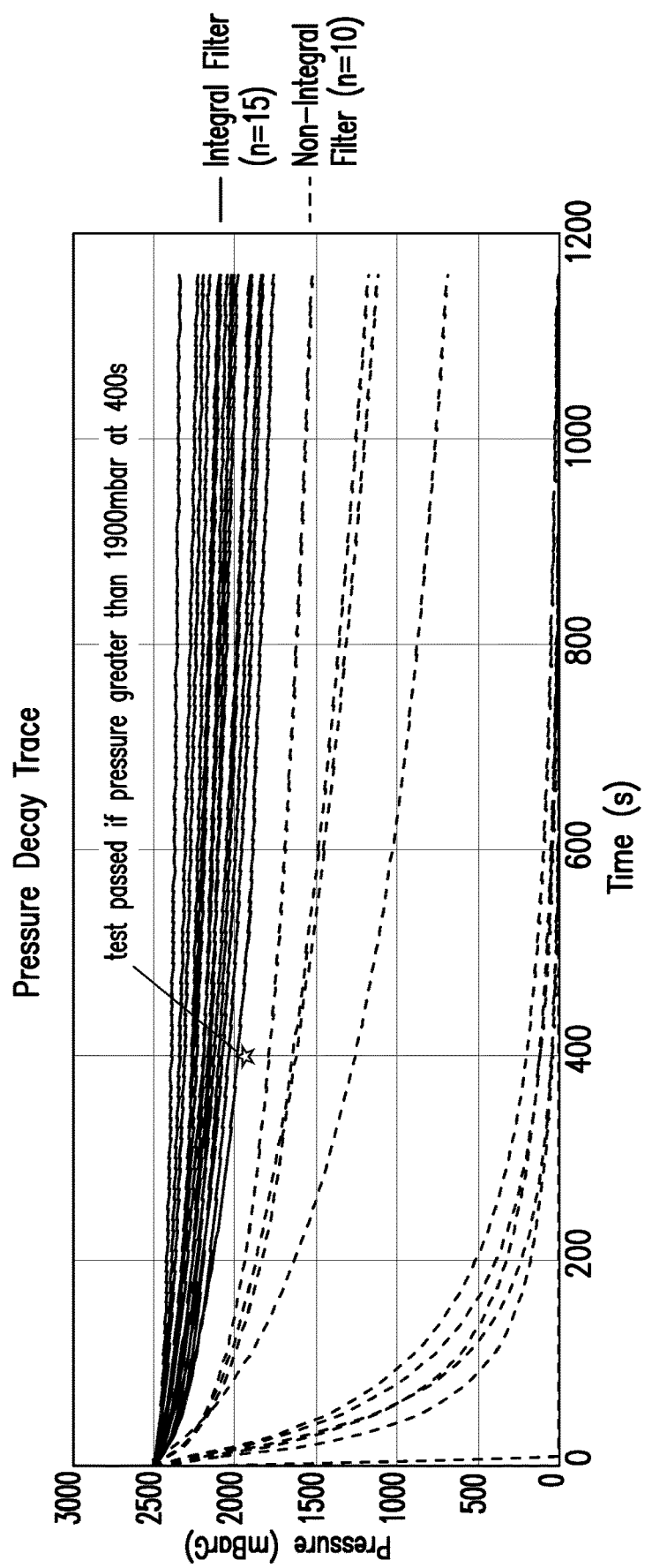
FIG. 4 shows pressure decay curves resulting from tests of integral and non-integral PTFE filter devices based on another aspect of the invention.

As shown in the pressure decay trace in FIG. 4, after 20 minutes (1200 seconds), the pressure (mBarG) for the 15 devices with integral membranes ranges from about 1750 to about 2400 mBarG. In contrast, for devices with several of the non-integral membranes, the pressure is 0 mBarG in about 1000 seconds, and the pressure did not reach over about 1500 mBarG for any non-integral membrane.

This example shows that a pass/fail limit can be drawn between devices with integral and non-integral PTFE membranes.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred aspects of this invention are described herein, including the best mode known to the inventors for carrying out the invention. Variations of those preferred aspects may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for testing integrity of a filter device including a porous membrane having an upstream surface and a downstream surface, the filter device comprising a housing having an inlet and an outlet and defining a fluid flow path between the inlet and the outlet, wherein the porous membrane is arranged across the fluid flow path, the method comprising:

(a) passing a test liquid from a test liquid source from a side of the outlet along a test liquid source conduit on the side of the outlet and a test liquid conduit on the side of the outlet through the outlet of the filter device so as to fill the test liquid conduit and to cover the downstream surface of the porous membrane with the test liquid;

(b) preventing additional test liquid flow from the test liquid source to the test liquid source conduit and to the test liquid conduit;

(c) passing gas along a gas flow conduit from downstream of the test liquid conduit and into the test liquid conduit filled with the test liquid, including applying a first pre-determined gas pressure on the test liquid in the test liquid conduit;

(d) preventing additional gas from passing along the gas flow conduit so as to prevent applying additional gas pressure on the test fluid in the test liquid conduit;

(e) monitoring gas pressure on the test liquid in the test liquid conduit; and measuring a decay in the gas pressure on the test liquid in the test liquid conduit over a pre-determined period of time, wherein if the gas pressure on the test liquid in the test liquid conduit decreases below a second pre-determined gas pressure, the filter device is considered to lack integrity.

2. The method of claim 1, wherein the filter device housing includes at least one vent port and the method further comprises (f) draining test liquid from the filter device though the at least one vent port.

3. A system for testing integrity of a filter device comprising:

(a) a test fluid source; a test liquid source; conduit positioned on an outlet side of the filter device and connected to the test fluid source;

(b) a test liquid conduit positioned on the outlet side of the filter device and in fluid communication with both the test liquid source conduit and an outlet of the filter device including a porous membrane having an upstream surface and a downstream surface, the filter device comprising a housing having an inlet and the outlet and defining a fluid flow path between the inlet and the outlet, wherein the porous membrane is arranged across the fluid flow path, wherein the test fluid source passes a test liquid from the test liquid source along the test liquid source conduit and the test liquid conduit through the outlet of the filter device so as to fill the test liquid conduit and to cover the downstream surface of the porous membrane with the test liquid;

(c) a flow control device associated with the test liquid source conduit for preventing additional test liquid flow from the test liquid source to the test liquid source conduit and the test liquid conduit a gas flow conduit positioned downstream of the test liquid conduit and in fluid communication with the test liquid conduit, the gas flow conduit connected to a compressed air supply source via a valve controller, wherein the valve controller applies a first pre-determined gas pressure on the test fluid in the test liquid conduit;

(d) a flow control device associated with the gas flow conduit for preventing applying additional gas pressure on the test fluid in the test liquid conduit; a fluid connector in fluid communication the test liquid source conduit, the test liquid conduit, and the gas flow conduit;

(e) a pressure sensor arranged to measure gas pressure on the test fluid in the test liquid conduit; and a monitoring unit measuring a decay in the gas pressure on the test liquid in the test liquid conduit over a pre-determined period of time, wherein if the gas pressure on the test liquid in the test liquid conduit decreases below a second pre-determined gas pressure, the filter device is considered to lack integrity.

4. The system of claim 3, further comprising (f) a flow sensor arranged to sense liquid entering the test liquid conduit.

* * * * *